US005682135A

United States Patent [19]

Labonde

[11] Patent Number: 5,682,135

[45] Date of Patent: Oct. 28, 1997

[54] MOTOR VEHICLE SECURITY SYSTEM

[75] Inventor: Damien Labonde, Essen, Germany

[73] Assignee: Kiekert AG, Heiligenhaus, Germany

[21] Appl. No.: 633,970

[22] Filed: Apr. 19, 1996

[30] Foreign Application Priority Data

May 4, 1995 [DE] Germany ........................ 195 16 316.8

[51] Int. Cl.[6] ........................................ B60R 25/10

[52] U.S. Cl. ........................ 340/426; 346/425.5; 346/567; 307/10.2; 307/10.5; 180/287

[58] Field of Search .................................... 340/426, 567, 340/825.31, 825.69, 825.72, 425.5; 180/287, 289; 307/10.2, 10.4, 10.5; 70/237, 256, 257, 278; 361/179

[56] References Cited

U.S. PATENT DOCUMENTS

| | | | |
|---|---|---|---|
| 4,258,352 | 3/1981 | Lipshutz | 307/10.2 |
| 4,266,124 | 5/1981 | Weber et al. | 340/556 |
| 4,738,334 | 4/1988 | Weishaupt | 340/426 |
| 4,804,945 | 2/1989 | Millet | 340/567 |
| 4,811,013 | 3/1989 | Akutsu | 307/10.2 |
| 4,835,533 | 5/1989 | Akutsu | 307/10.5 |
| 5,424,712 | 6/1995 | Rosenberger | 340/426 |
| 5,497,641 | 3/1996 | Linde et al. | 70/257 |

FOREIGN PATENT DOCUMENTS

| | | | |
|---|---|---|---|
| 33 13 089 | 10/1984 | Germany | H04M 1/00 |
| 35 36 377 | 4/1987 | Germany | B60R 25/00 |

*Primary Examiner*—Brent A. Swarthout
*Assistant Examiner*—Van T. Trieu
*Attorney, Agent, or Firm*—Herbert Dubno

[57] ABSTRACT

An automotive security system in which an infrared motion detector in the handle recess of a door of the vehicle detects the incipient engagement of the handle by an authorized user to trigger the vehicle transponder into transmitting an interrogation signal. The latter is picked up by a portable transponder on the person of that individual and which then emits a coded answer signal. The latter is compared in the vehicle transponder with a stored code and upon agreement the door lock is released so that the lock release is complete as the user exerts an initial pull on the door handle.

18 Claims, 2 Drawing Sheets

MOTOR VEHICLE SECURITY SYSTEM

FIELD OF THE INVENTION

The present invention relates to a motor vehicle security system and, more particularly, to a security system for an automotive vehicle which permits opening of a vehicle door only by an authorized person. More particularly this invention relates to a vehicle system of this type in which a transponder on the vehicle emits a coded interrogation signal which is detected by a portable transponder carried by the authorized person, the latter transmitting a coded answer signal which, when compared with a signal registered in the vehicle transponder, results in the generation of a door unlocking signal.

BACKGROUND OF THE INVENTION

Motor vehicle lock systems responsive to transponder signals are known, for example, from German Patent 33 13 089. Such systems can include electronic locks for one or more vehicle doors and, generally, for the trunk of the vehicle, and a transponder on the vehicle which emits a coded interrogation signal.

The authorized person can have a portable transponder, as opposed to the transponder which is fixed on the vehicle and which, in response to a proper interrogation code as received from the vehicle transponder, will emit a coded answer signal.

The vehicle or stationary transponder may, in turn, have a code signal comparator which compares the code carried by the answer signal with an authorization code programmed into the vehicle transponder and which can be referred to as a stored expected coded signal, so that, if the answer code corresponds to the registered code, the lock system, will be actuated and at least one door is unlocked. Usually, the locks have security positions in which they can be manually operated only once the security position is removed and the electrical system can release the security position for all or selected locks, thereby permitting the authorized person, in possession of the portable transponder, to operate whatever door may require opening.

The transponder is a combined transmitter and receiver which operates with electromagnetic waves and the portable transponder may be a self contained unit which can be carried on the person of the user, e.g. as part of a keychain or as an independent device. The stationary transponder, powered by the vehicle battery, is connected, as described with the lock system.

The electromagnetic radiation with which the transponders operate may be in the optical range of the spectrum, especially in the infrared optical range, or may be in the shortwave, especially in the ultrashortwave portion of the electromagnetic spectrum. When reference is made to opening of the vehicle, it will be understood that it is intended thereby to indicate the opening of a vehicle door or the trunk of the vehicle.

In German patent 33 13 089 the switching signal does not derive from the stationary transponder on the vehicle but rather from the portable transponder, i.e. by the pressing of a button on the portable transponder.

In German Open Application DE 35 36 377, the lock switching signal derives from the stationary transponder on the vehicle. In this system a switch is provided on the vehicle which is coupled with an outer door handle and which enables unlocking when the handle is manually actuated.

In this case, the stationary transponder is activated only once the handle is engaged, i.e. the switch connected with the handle is closed. It is common, with such a system, for the authorized person who has gripped the handle to simultaneously give it a pull, intending to open the door.

However, since it does take a finite time period, once the switch coupled to the handle is closed, for the vehicle transponder to transmit its interrogation signal, for the portable transponder to generate the answer signal, for the codes to be compared and for the electrical opening signal to be transmitted, a second pull is necessary with a certain time delay before the door will open. Frequently the user initiates the second pull before there has been the lapse of a sufficient time period, in which case the door will not open.

A system in which the door is merely unlocked with the first pull and can be opened only with the second pull on the door handle is inconvenient in many cases and has a detrimental effect on the actuating convenience and reliability. While one might expect that these drawbacks could be avoided by continuously operating the vehicle transponder to transmit interrogation signals, this approach has the drawback that it causes high electrical power consumption for the lock system and may reduce the battery charge of the vehicle.

OBJECTS OF THE INVENTION

It is, therefore, the principal object of the present invention to provide an improved motor vehicle security system with better actuating convenience and reliability.

Another object of the invention is to provide a vehicle security system which can be operated by an authorized person but which is free from the drawbacks of the earlier systems mentioned previously.

Still a further object of this invention is to provide a vehicle security system of the transponder type which eliminates the need for a double pull on the door handle and nevertheless has low battery drain.

SUMMARY OF THE INVENTION

These objects and others which will become apparent hereinafter are attained, in accordance with the invention, in an automotive vehicle security system of the transponder type described wherein the switching signal for the stationary transponder derives from an infrared movement detector, i.e. an infrared receiver positioned in the region of the door handle of the door to be opened and which produces a signal when the hand of the authorized person moves toward the door handle and/or around the door handle.

In particular, the detector of the infrared movement sensor or receiver can be located in the grip recess of the door handle, i.e. the recess formed in the wall of the door in front of which the door handle is provided.

In a preferred embodiment of the invention, the detector is provided with acquisition optics which focus the infrared radiation in the pattern of a cone upon the detector from the hand of the user as the hand passes into the recess or around the door handle.

The acquisition characteristic, i.e. the pattern to which the optics and detector respond, can be such as to pick up infrared rays from above and below the door handle and/or at the front or rear sides thereof.

With respect to the electronics of the system, it has been found to be advantageous to provide the detector with an amplifier and a microprocessor for processing the amplified signal from the detector and programmed to define a range of the infrared radiation such that false activation by environmental and other spurious influences can be suppressed.

The acquisition optics, moreover, may comprise a row of lens elements which generate successive pulses upon movement of the hand into and around the handle, the successive pulses being applied to an identifying electronic circuit which is capable of distinguishing the hand movement.

Infrared motion detectors or proximity detectors are, of course, known in a wide variety of applications, particularly to detect the presence of an object at a particular location. They are both reliable and tested and are readily adapted to the positions of the present invention. Since the infrared receiver detects the motion of the hand even before the grip is engaged and triggers the transponder operation, the transponder system can respond to provide the unlocking signal even before or just as the person tightens his or her grip upon the handle and applies the opening pull thereto. Since only one pull is necessary to open the door although full security is provided by the transponder system, the system operates with improved comfort and reliability as well as convenience. A motor vehicle system in accordance with the invention thus can comprise:

at least one electrically operatable door lock on a motor vehicle;

a door handle on the vehicle;

a first transponder on the vehicle connected with the lock for emitting a coded interrogation signal, receiving a coded answer signal representing authorized access, and verifying the coded answer signal to generate a lock operating signal;

a portable transponder carried by a person with authorized access to the vehicle for receiving the coded interrogation signal and transmitting the coded answer upon receipt of the coded interrogation signal; and an infrared receiver proximal to the door handle, responsive to presence of a hand of the person in a region of the door handle, and connected to the first transponder for triggering the first transponder to emit the coded interrogation signal, thereby enabling generation of the lock operating signal for an initial actuation of the door handle.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
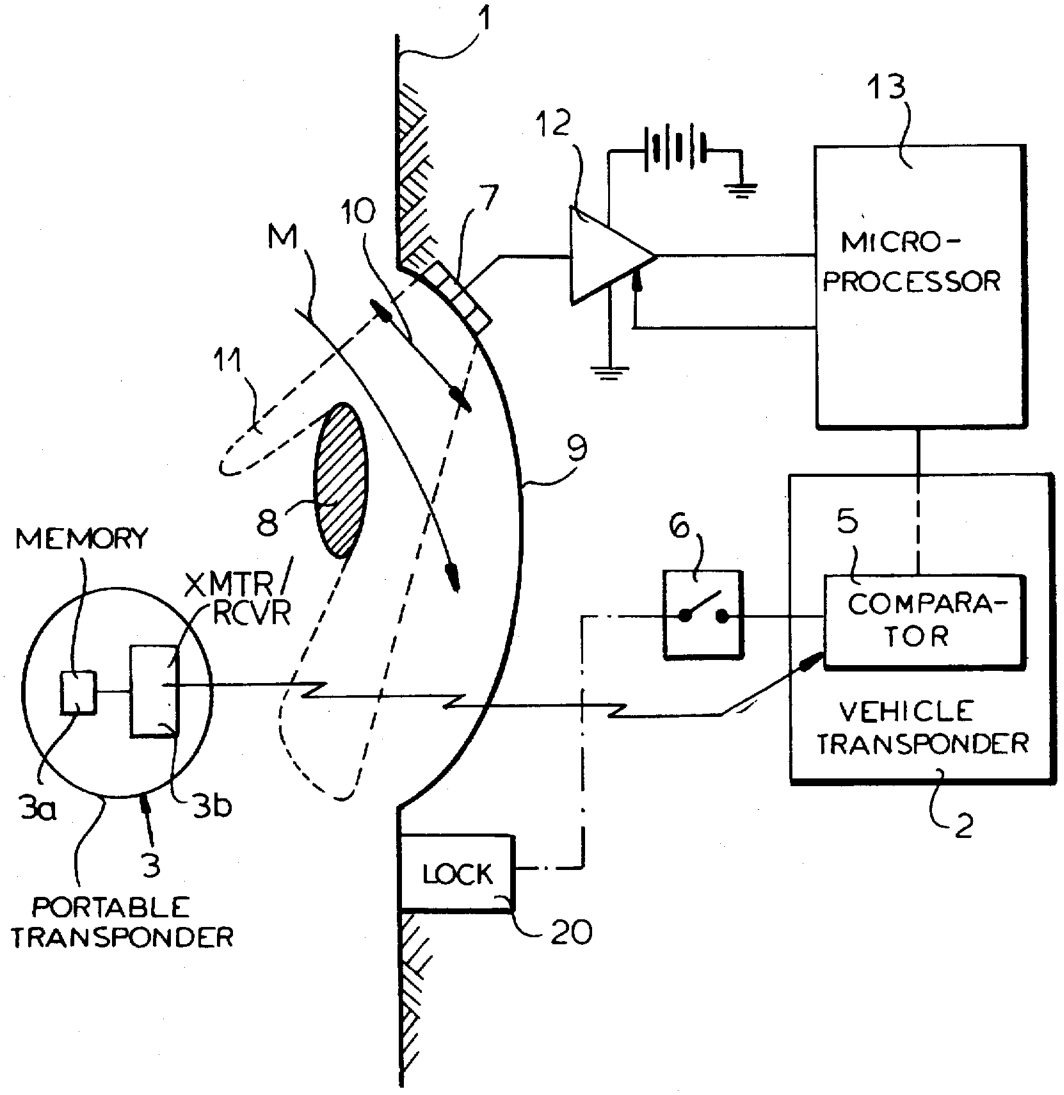
FIG. 1 is a partial section in the region of a vehicle door and a block diagram of the security system of the invention.

FIG. 1 shows a section through a door 1 of a vehicle not otherwise shown in detail but which is provided with the automotive security system of the present invention. The latter can have an electronically operated door lock as has been represented at 20. It can be operated via a switch 6 to enable door opening. The switch 6, which can be any electronic switching device, is in turn operated by the vehicle or stationary transponder 2 as will be described in greater detail hereinafter.

The system comprises the stationary transponder 2 which, as has been described, generates and transmits an interrogation code signal which can be picked up by a portable transponder 3 carried by an individual authorized to have access to the vehicle and, if desired, having a memory 3*a* which can be programmed with an answer code and a transmitter receiver unit 3*b* which can receive the interrogation signal from the stationary or vehicle transponder and emit the coded answer signal which, in turn, can be picked up by the vehicle transponder 2.

The system further includes an infrared receiver 7 for generating a switching signal for the stationary transponder 2 on the vehicle. The stationary transponder 2 can have a code comparator 5 for comparing the answer code with a stored code representing the portable transponder and hence the authorized individual seeking access so that the signal to the electronic switch 6 of the door lock 20 can be transmitted upon agreement of the answer code with the stored code. The door lock 20 may represent one of a plurality of locks which are released by the electronic switch 6.

The authorized person, of course, is the individual carrying the portable transponder 3.

Figure 2:
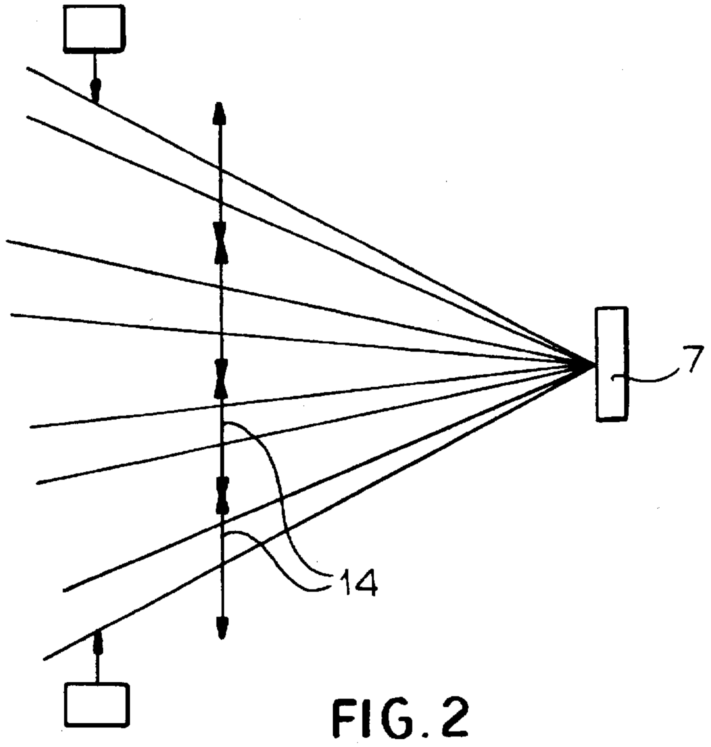
FIG. 2 illustrates the principle of detecting the hand movement of an authorized person in terms of the emitted infrared radiation in a system in accordance with the system.

As a comparison of FIGS. 1 and 2 will show, the infrared receiver 7 for generating a switching signal for the stationary transponder 2 is a detector for infrared radiation emitted by the hand of the authorized person. The detector 7 is located in the region of the door handle 8 of the door which is to be opened. The infrared receiver, 7, therefore, responds to movement of a hand as represented by the arrow M around the door handle.

In a preferred embodiment, the infrared receives 7 is located in the handle recess 9 of the door 1. It is located behind the handle 8 and can be provided with acquisition optics as represented diagrammatically at 10 and which can include one or more lenses focusing the infrared radiation upon the receiver 7.

The acquisition optics 10 is so arranged that it defines an acquisition characteristic 11, i.e. a zone and range of infrared radiation pickup which can be located both on top of and below the handle 8 and from the front to the rear of the handle 8, the characteristic having the form generally of a cone focused toward the infrared receiver 7.

The infrared sensor output is applied through an amplifier 12 to a microprocessor 13 connected to or forming part of the transponder 2 and which evaluates the signals from the infrared receiver 7, establishes the range thereof and reduces or suppresses false activations of the vehicle transponder 2 which might result from environmental or other spurious effects in the region of the handle. The range can be several centimeters and usually about 5 centimeters will suffice for identification of a hand and timely unlocking of the vehicle door before the initial pull on the handle 8.

As FIG. 2 indicates, the 10 can comprise a row of lens elements 14 which are so oriented that they successively respond to the movement of the hand of the authorized person into the recess 9 to generate a succession of pulses 15 as indicated in FIG. 2 in which the pulse amplitude is plotted along the ordinate 17 against time along the abscissa 16. This sequence of pulses can be detected by the microprocessor 13 and identified as the movement of a hand intending to open the door, thereby eliminating the possibility of false operation of the transponder 2.

Figure 3:
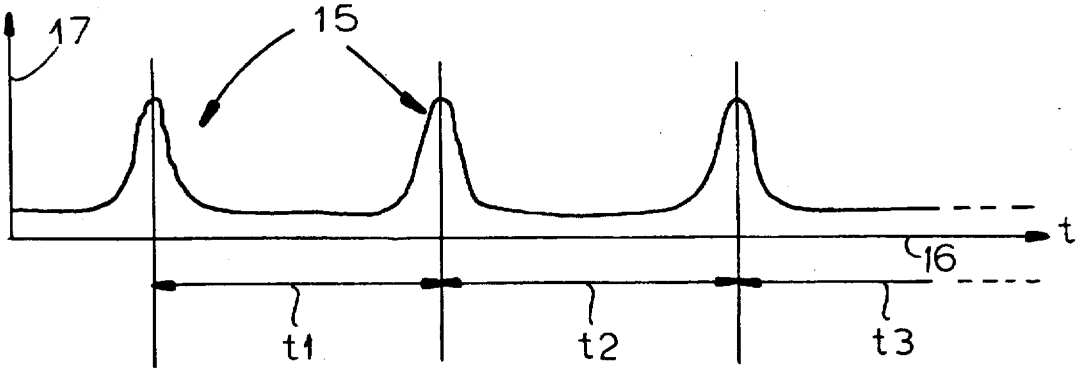
FIG. 3 is a graph of the pulses resulting in such a system.

In operation, therefore, the authorized individual carrying the portable transponder 3, approaches the vehicle and inserts a hand behind the handle 8 to generate the pulse train shown in FIG. 3 which is identified via the microprocessor 13. The latter transmits the triggering signal to the transponder 2 which emits the interrogation coded signal which is picked up by the portable transponder and answered by the coded answer signal. The latter is compared at 5 with the stored code and the transponder 2, upon agreement, operates the unlocking switch 6 to release the lock 20 so that the lock is already released when the person exerts a pull upon the handle 8.

I claim:

1. A motor vehicle security system comprising:

at least one electrically operatable door lock on a motor vehicle;

a door handle on said vehicle;

a first transponder on said vehicle connected with said lock for emitting a coded interrogation signal, receiving a coded answer signal representing authorized access, and verifying said coded answer signal to generate a lock operating signal;

a portable transponder carried by a person with authorized access to said vehicle for receiving said coded interrogation signal and transmitting said coded answer upon receipt of said coded interrogation signal; and an infrared receiver proximal to said door handle, responsive to presence of a hand of said person in a region of said door handle, and connected to said first transponder for triggering said first transponder to emit said coded interrogation signal, thereby enabling generation of said lock operating signal for an initial actuation of said door handle.

2. The motor vehicle security system defined in claim 1 wherein said infrared receiver is positioned to detect movement of said hand toward said handle.

3. The motor vehicle security system defined in claim 1 wherein said infrared receiver is positioned to detect movement of said hand around said handle.

4. The motor vehicle security system defined in claim 1, further comprising a wall rearwardly of said handle and formed with a door recess receiving said hand upon engagement thereof with said handle, said infrared receiver being positioned on said wall.

5. The motor vehicle security system defined in claim 1, further comprising acquisition optics for said receiver focussing infrared radiation from said hand into at least one cone rearwardly of said handle onto said infrared receiver.

6. The motor vehicle security system defined in claim 5 wherein said acquisition optics has an acquisition characteristic accepting infrared rays from both above and below said handle.

7. The motor vehicle security system defined in claim 5 wherein said acquisition optics has an acquisition characteristic accepting infrared rays from both a region in front of and a region rearwardly of said handle.

8. The motor vehicle security system defined in claim 5 wherein said acquisition optics has an acquisition characteristic accepting infrared rays from both above and below said handle and from both a region in front of and a region rearwardly of said handle.

9. The motor vehicle security system defined in claim 5 wherein said acquisition optics includes a multiplicity of lens elements arrayed in a row for generating time-spaced signal pulses upon movement of the hand in the region of said handle, and electronic circuitry responsive to said pulses for identifying same as representing movement of the hand in the region of said handle.

10. The motor vehicle security system defined in claim 1, further comprising an amplifier connected to said receiver, said first transponder including a microprocessor connected to said amplifier for evaluating an amplified signal from said receiver, establishing a range therefor and suppressing false activations by spurious effects.

11. The motor vehicle security system defined in claim 10 wherein said infrared receiver is positioned to detect movement of said hand toward said handle.

12. The motor vehicle security system defined in claim 11 wherein said infrared receiver is positioned to detect movement of said hand around said handle.

13. The motor vehicle security system defined in claim 11, further comprising a wall rearwardly of said handle and formed with a door recess receiving said hand upon engagement thereof with said handle, said infrared receiver being positioned on said wall.

14. The motor vehicle security system defined in claim 11, further comprising acquisition optics for said receiver focussing infrared radiation from said hand into at least one cone rearwardly of said handle onto said infrared receiver.

15. The motor vehicle security system defined in claim 14 wherein said acquisition optics has an acquisition characteristic accepting infrared rays from both above and below said handle.

16. The motor vehicle security system defined in claim 14 wherein said acquisition optics has an acquisition characteristic accepting infrared rays from both a region in front of and a region rearwardly of said handle.

17. The motor vehicle security system defined in claim 14 wherein said acquisition optics has an acquisition characteristic accepting infrared rays from both above and below said handle and from both a region in front of and a region rearwardly of said handle.

18. The motor vehicle security system defined in claim 14 wherein said acquisition optics includes a multiplicity of lens elements arrayed in a row for generating time-spaced signal pulses upon movement of the hand in the region of said handle, and electronic circuitry responsive to said pulses for identifying same as representing movement of the hand in the region of said handle.

* * * * *